United States Patent [19]

Sticht

[11] Patent Number: 5,143,506
[45] Date of Patent: Sep. 1, 1992

[54] APPARATUS FOR RELATIVELY ARRANGING INDIVIDUAL PARTS

[76] Inventor: Walter Sticht, Karl-Heinrich-Waggerl-Strasse 8, A-4800 Attnang-Puchheim, Austria

[21] Appl. No.: 586,421

[22] Filed: Jul. 21, 1990

[30] Foreign Application Priority Data

Sep. 27, 1989 [AT] Austria ............................ 2253/89

[51] Int. Cl.⁵ .......................................... B65G 41/00
[52] U.S. Cl. .................................. 414/421; 198/443; 198/397; 414/394; 414/356; 414/574; 414/401; 414/414
[58] Field of Search ............... 198/443, 397; 414/574, 414/356, 421, 403, 400, 401, 573, 355, 414, 394, 390

[56] References Cited

U.S. PATENT DOCUMENTS

| | | | |
|---|---|---|---|
| 1,466,724 | 9/1923 | McMeans | 414/356 X |
| 2,209,340 | 7/1940 | Landry | 198/443 |
| 3,231,107 | 1/1966 | Clar | 414/400 X |
| 3,312,360 | 4/1967 | Nectoux | 414/573 |
| 3,468,407 | 9/1969 | Fürst | 198/443 |
| 3,830,357 | 8/1974 | West et al. | 414/574 X |
| 4,063,642 | 12/1977 | Sticht et al. | |
| 4,099,609 | 7/1978 | Kieronski et al. | 198/397 X |
| 4,802,810 | 2/1989 | Gunn | 414/421 X |
| 4,953,684 | 9/1990 | Beswick et al. | 198/443 X |
| 4,982,891 | 1/1991 | Kimura et al. | 414/356 X |

FOREIGN PATENT DOCUMENTS

2754778 6/1979 Fed. Rep. of Germany ...... 414/574

Primary Examiner—Frank E. Werner
Attorney, Agent, or Firm—Collard & Roe

[57] ABSTRACT

This invention relates to an apparatus for the aligning and/or sorting, and if applicable separating, individual parts in particular such parts that are connected to each other or remain adhered to each other. The apparatus comprises a machine frame and a first conveying device mounted thereon. A storage area for a disordered quantity of the individual parts is arranged in front of the conveying device and a linear second conveying device for the aligning and/or sorting the individual parts is arranged so as to follow the first conveying device. The storage area is exchangeably connectable to the conveying device, with the interposition of a docking device.

12 Claims, 7 Drawing Sheets

Fig. 10 ial parts which are attached to each other or remain adhered to each other. The apparatus comprises a machine frame and a first conveying device mounted thereon, a storage area for a disordered quantity of said individual parts being arranged in front of the first conveying device and being followed by a linear second conveying device for the relative arrangement of said individual parts.

BACKGROUND OF THE INVENTION

There is described in U.S. Pat. No. 4,063,642, dated Dec. 20, 1977, apparatus comprising a machine frame with a conveying device mounted thereon and being in the form of a conveying brush. In front of the conveying brush is a storage area for a disordered quantity of individual parts and following the storage area is a linear conveying device, in the form of a vibratory conveyor for aligning and/or sorting the individual parts. Although such apparatus have proved to be successful in aligning, sorting and separating individual parts, additional devices need to be provided in order to enable rapid changes in the type of the individual parts to be processed by means of the apparatus.

The present invention is intended to avoid this disadvantage.

SUMMARY OF THE INVENTION

According to the present invention the storage area is arranged to be interchangeably connected to said first conveying device with the interposition of a docking device. Storage areas can thus be attached to and removed from the first conveying device.

An advantage of the invention is that rapid changeover of said types of individual parts can be effected with the use of standard devices, it being possible to supply the apparatus with said individual parts substantially automatically. Thus, the quantity of parts which can be put in readiness for processing by means of the apparatus is almost unlimited, and no operators are needed for loading the apparatus with parts to be processed.

According to an embodiment of the invention there can be achieved rapid exchange of, and free use of, said storage areas, for supplying different apparatus for aligning and/or sorting said individual parts, the storage areas being constructed as changeover containers.

The conveying of the storage areas from the apparatus for aligning and/or sorting said parts to storage places or respectively to filling stations can be facilitated by providing the changeover containers with travelling gear.

Each container may be adjustable with respect to said first conveying device in order to enable the quantity of individual parts to be fed into a receiving chute of the first conveying device, to be altered by simple means.

Each said container may be adjustable on its travelling gear not only for dosaged supply of the individual parts contained therein to the first conveying device, but also for ready charging or discharging of the changeover container.

Each changeover container may be provided with its own travelling drive means whereby handling of the changeover containers is facilitated, or travelling drive means may be provided on or only upon some of the travelling gear at an assembly area.

Means may be provided for constant and exact connection between the changeover containers and the machine frame so that the spilling of individual parts or hindrance in the supply, thereof, from the storage area into the receiving chute of the first conveying device is avoided.

It can also be enabled that said containers can, independently of control-and-supply lines, be brought into large work areas rapidly and safely from a central filling station or from a material distribution point, into the region of assembly areas or assembly installations.

A control center may be provided for overall control of the said containers.

Rails for the guidance of the changeover containers can also be used simultaneously for conveying of information to or from the control center.

Each storage area may be pivotable about a horizontal axis, for the dosaged supply of said individual parts to the first conveying device and may be interchangeable on the travelling gear, for rapid exchange of the storage areas for allocation to different travelling gear.

Conveyor track means may be provided so that the changeover containers can be moved without the use of said travelling gear between individual ones of said apparatus for aligning and/or sorting.

Friction-free operation of such changeover containers may be provided for.

DETAILED DESCRIPTION OF THE INVENTION

Figure 1:
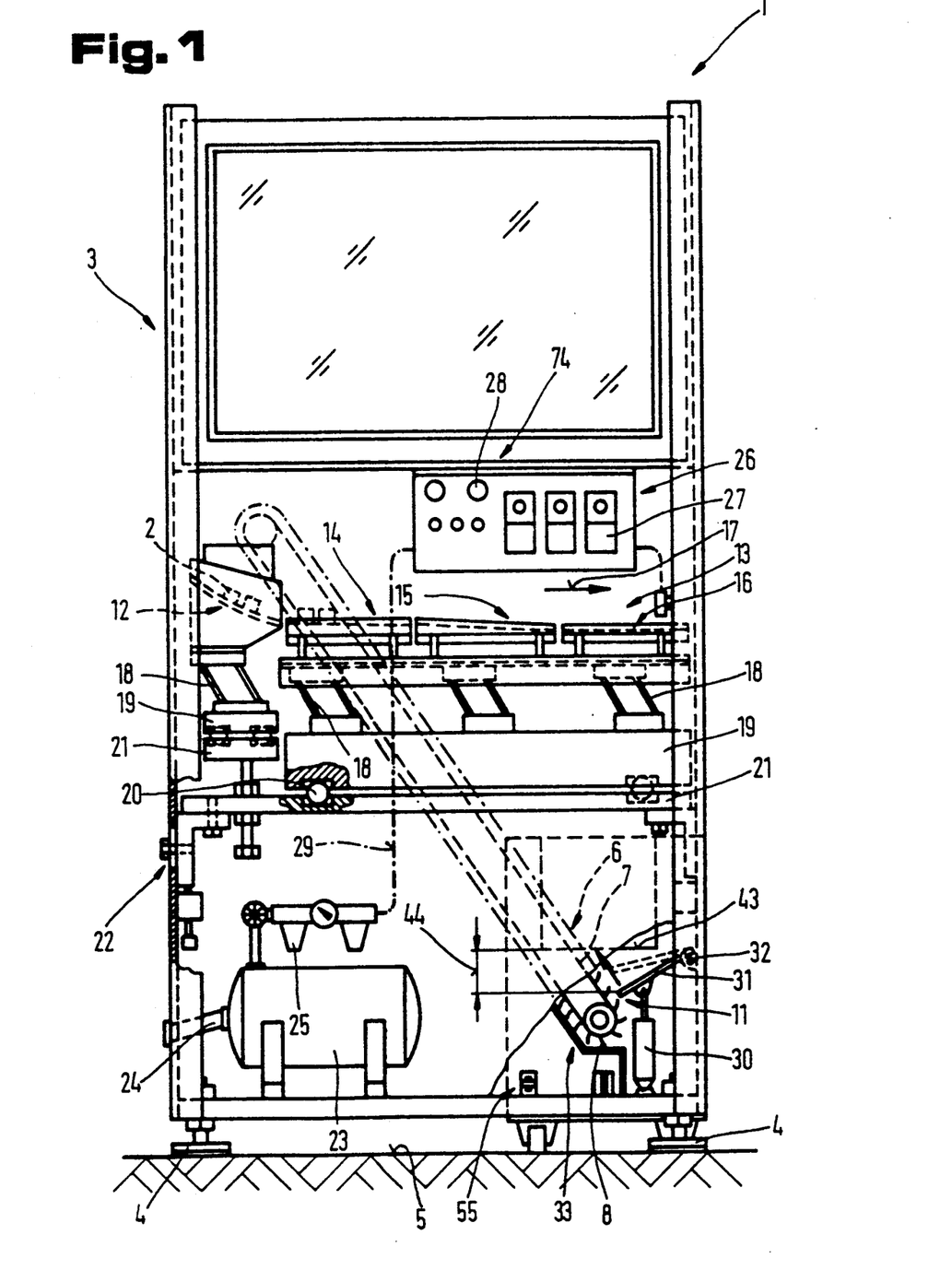
FIG. 1 is a diagrammatic and simplified side view, shown partly in section, of apparatus for aligning and/or sorting individual parts.
Figure 2:
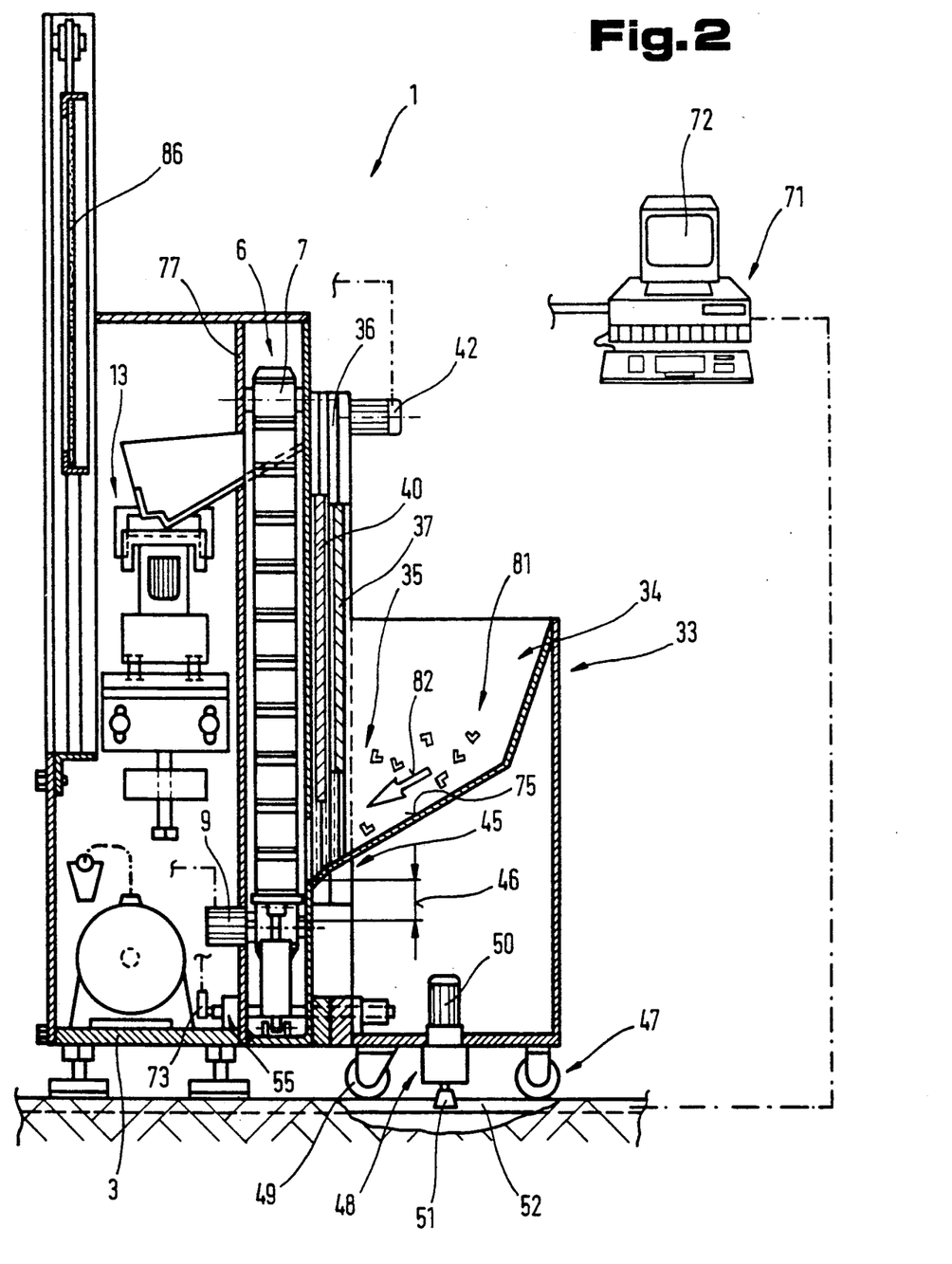
FIG. 2 is a front view of the apparatus of Figure 1 shown partly in section.
Figure 3:
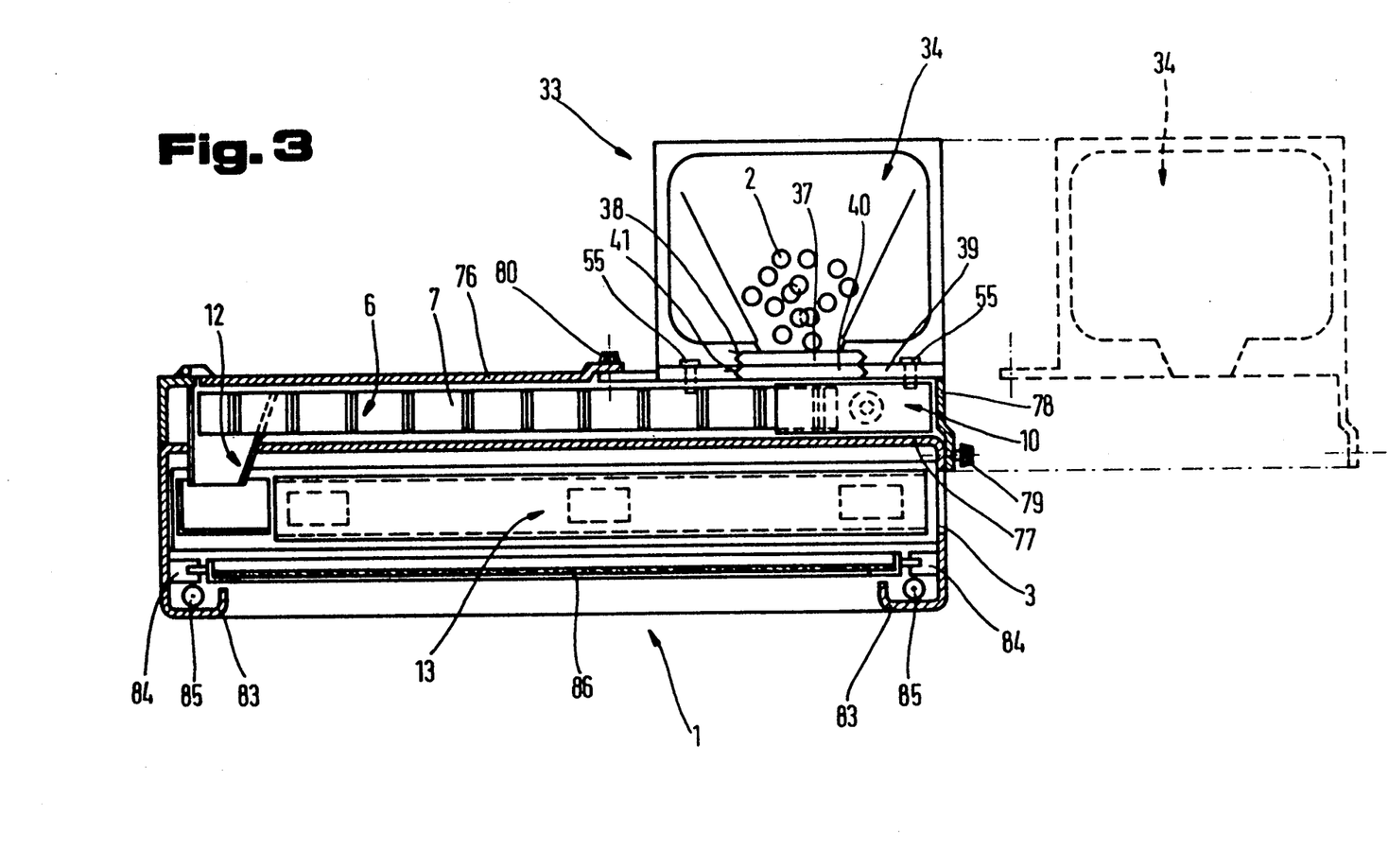
FIG. 3 is a plan view of the apparatus of Figures 1 and 2.
Figure 4:
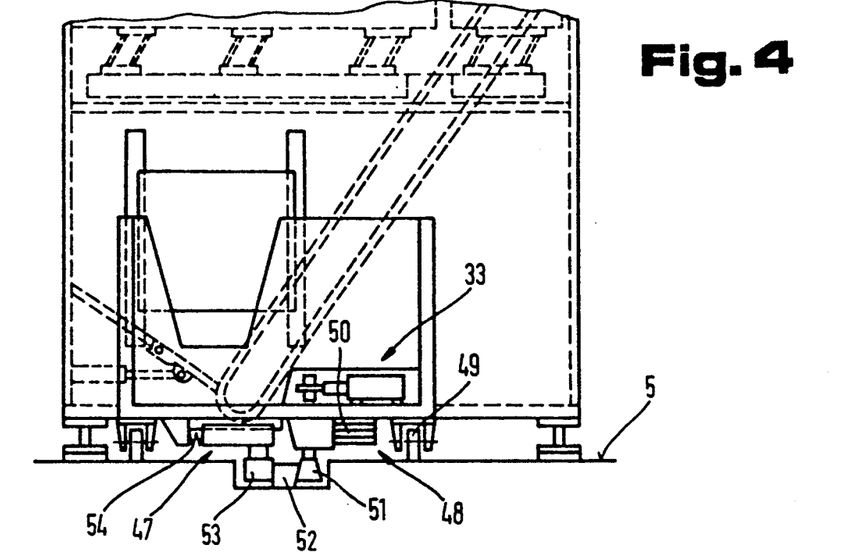
FIG. 4 is a diagrammatic and simplified side view shown partly in section of a docking arrangement between said apparatus and a changeover container.

As shown in FIGS. 1 to 3, apparatus, for aligning and/or sorting, and if necessary separating, individual parts 2, comprises a machine frame 3 supported by means of vertically adjustable feet 4 on a work surface 5, for example a floor of a workshop. A conveying device 6 in the form of an elevator conveyor mounted on the frame 3 has a revolving conveyor belt 7 with entrainment elements 8 thereon.

The conveyor belt 7 which is driven by means of a driving motor 9, in the direction indicated by an arrow, extends upwards from a receiving chute 10, in which is arranged a feed device 11, in the region of a deflection chute 12 which is followed by a linear conveying device 13. The device 13 comprises individual conveying sections 14, 15 and 16, in which by the use of known components such as balancing crosspieces and/or deflectors and/or grooves the individual parts 2 are aligned or sorted as they are conveyed in the direction of an arrow 17 in FIG. 1. The individual parts 2 in the conveying sections 14 to 16 or in the region of the deflection chute 12, are conveyed by means of vibration drives 18, arranged on a support plate 19, which is in turn supported on oscillation damping devices 20 on a base plate 21 attached to the frame 3. The base plate 21 can be aligned by means of an adjusting device 22 to different positions with respect to the working surface 5 for example, so as to be parallel with, or inclined with respect to, the conveying direction indicated by the arrow 17.

For the supply of compressed air and for the control of the individual drives or driving motors there is arranged on the frame 3, an intermediate storage unit 23 connected by way of a duct 24 to a central compressed air supply system. The storage unit 23 is connected to a maintenance unit 25 and a pneumatic control unit 26 provided with valves 27 and operating and display elements 28. The control unit 26 is connected by way of ducts 29 (shown in phantom lines) to the maintenance unit 25 and a lifting drive 30 for the feed device 11, which comprises a plate providing a base 31 of the receiving chute 10. The chute base 31 is hinged to the frame 3 for pivotal movement about an axis 32, at its end remote from the conveyor belt 7. The base 31 is pivotal by means of the lifting drive 30, from a position of rest shown in solid lines in FIG. 1 into a raised position shown in broken lines therein. The drive 30 engages the base 31 at a position which is spaced from its axis 32. The base 31 is moved by the drive 30 to supply the individual parts 2 to the conveyor belt 7.

On the side of the conveying device 6 facing away from the linear conveying device 13 is a storage area 34 in front defined by the receiving chute 10, of a changeover container 33, which can be connected by way of an outlet 35 to the receiving chute 10. In the front wall 36 of the storage container 34, facing the conveying device 6 is a slide 37 which can be lowered or raised along vertical guides 38 from rhe position shown in FIG. 2 to free outlet 35, into a position indicated by broken lines, to close the outlet 35. Likewise, an adjustable chute wall plate 40 is provided in a side plate 39 closing off the conveying device 6 from the changeover container 33. The receiving chute 10 can be closed with respect to the outlet 35 of the storage area 34 by means of the plate 40. An adjustment drive 42 (best seen in FIG. 2) is provided for adjusting the wall plate 40 in vertical guides 41 of the side plate 39. The drive 42 may be an electric motor, drivingly connected to a chain wheel, in engagement with a chain connected to the wall plate 40. Alternatively, the drive for the wall plate 40 or for the slide 37 may be pneumatic or hydraulic piston-and-cylinder units, for example.

As best seen in FIGS. 1 and 2, an upper edge 43, of the side plate 39 proximate to the adjustable chute wall plate 40, is spaced by a distance 44 above the end of the chute base 31 facing the conveyor belt 7. Similarly, an outlet edge 45 is spaced by a distance 46 above the end of the chute base 31 facing the conveyor belt 7. Thus even when the chute wall plate 40 is open, a predetermined volume of the chute 10 remains to receive individual parts 2. There is, therefore, a corresponding store of individual parts 2 in the chute 10 when the storage container 33 is removed. The container 33 can be, therefore, exchanged, for example when the storage area 34 has been emptied, within the time taken by the conveying device 6 to process the individual parts 2 so stored in the receiving chute 10. Accordingly an operating cycle can usually be achieved whereby an empty changeover container 33 is conveyed away and a full changeover container 33 is docked in its place on the frame 3.

As best seen in FIGS. 2 and 4 to 7, the changeover container 33 can be arranged on undercarriage 47 having its own drive 48, and comprising wheels 49, which may be steerable, being for example rubber wheels or solid rubber rollers. The drive 48 comprises a driving motor 50 on the undercarriage 47. The motor 50 is drivingly connected to a driving roller 51, cooperating with a guide rail 52 let into the working surface 5, a guide roller 53, resting on the side of the rail 52 opposite to the driving roller 51. The guide roller 53 is urged against the drive roller 51 by means of a compression spring 54 supported on the undercarriage 47, so that the driving roller 51 and the guide roller 53 enclose the guide rail 52 between them, without play. If the drive roller 51 is made of an elastic material, having a sufficient coefficient of friction, non-slip forward movement of the travelling gear 47 and thus of the changeover container 33 along the guide rail 52 is thereby ensured.

Figure 5:
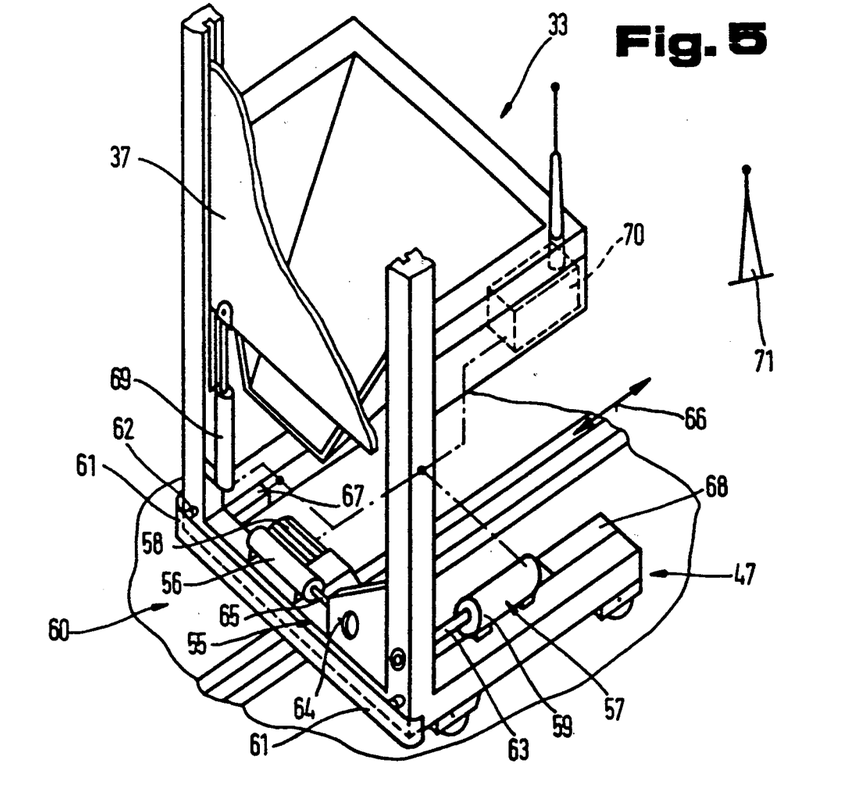
FIG. 5 is a diagrammatic and simplified isometric view showing a changeover container arranged on a travelling gear.

A docking device 55 serves to connect the undercarriage gear 47 and thus the changeover container 33 to the frame 3. The docking device 55 may comprise, for example, a locking device 56 and a centering device 57, as best seen in FIG. 5. A drive 58 or 59, respectively, is associated with each of the two devices. When the undercarriage 47 and thus the changeover container 33 contacts the frame 3, the drive 48 for the drive roller 51 is stopped for example by means of a switching device 60. For the prevention of accidents, the device 60 may comprise a protective bumper 61 which is displaced upon meeting an obstacle, to operate limit switches 62 to signal the drive to stop. This signal, or an output signal of any suitable additional measurement pickup means, may also be arranged to activate the docking device 55. Thus, by means of a centering pin 63 advanced by means of the drive 59, the undercarriage 47 can be exactly aligned with the machine frame 3, in order to balance out any measurement tolerances, there engaging in an opening of a coupling piece 64, a tongue, connected to the frame 3, which is braced by means of a tightening pin 65 which is urged by means of the drive 58 into a recess in said tongue, in the direction of movement of the undercarriage, as indicated by a douple arrow 66 in FIG. 5. The undercarriage 47 is thereby locked in a desired position with respect to the frame 3 by means of the docking device 55, thus ensuring that the slide 37 and the adjustable chute wall plate 40 lie exactly opposite to each other and the outlet edge 45 of the storage area 34 overlaps the edge 43 of the side plate 39 or is in alignment therewith. A continuous chute, free of slits, is produced for the individual parts 2 which are to be supplied from the storage area 34 to the conveying device 6.

Also as best seen in FIG. 5, a switching unit 67 on the undercarriage 47, has an energy source 68 connected thereto. The switching unit 67 is interconnected, by way of lines, indicated diagrammatically, to a closing drive 69 for the slide 37, to the drives 58 and 59 and also to the limit switches 62. The switching unit 67 maybe interconnected, in particular, with a transmitter/receiver device 70, arranged on the undercarriage gear 47 and by way of which data can be exchanged with a control centre 71 (shown diagrammatically in FIG. 5 as a transmitter mast), for controlling the travelling movements of the undercarraige 47 and the rapid exchange of empty changeover containers 33.

As shown in FIG. 2, connection to a control centre 71, and screens 72 arranged therein, can be effected by means of the guide rail 52. Measurement pickups 73 (FIG. 2) provided proximate to the machine frame 3 may be connected by way of a control device 74 (FIG. 1) of the apparatus 1, to the adjustment drive 42, so that upon a changeover container 33 being docked on the machine frame 3, a corresponding control signal is emitted to the control device 74, to open the chute wall plate 40 by means of the adjustment drive 42.

As shown in FIGS. 1 to 5, a chute base 75 of the storage area 34 is inclined in the direction of the conveying device 6, the outlet edge 45 of the storage area 34 running parallel to a side wall 76, delimiting the conveyor shaft of the conveyor belt 7 on its side remote from the linear conveying device 13. Said conveyor shaft is delimited on its side facing the device 13 by a side wall 77. A part of the side wall 76 is provided by the side plate 39, which also comprises an end wall 78 of the receiving chute 10. The side plate 39 is exchangeably secured by means of mounting devices 79 and 80 on the side walls 76 and 77. The mounting device 79 may be in the form of cooperating contact faces and screw connections, or self-centering bayonet catches or the like for connecting the side plate 39 to the machine frame 3 or the side wall 76. The side plate 39 can be exchanged for compatibility with different changeover containers 33. Some apparatus 1 cannot be fitted with changeover containers 33, by simple exchange of the side plate 39, for example those having a storage area 34 which is formed fixedly thereon, such apparatus 1, however, can be reequipped with a storage area 34 shown diagrammatically and in broken lines in FIG. 3 alongside the docked changeover container 33.

The chute base 75 may be so constructed that the quantity 81 of individual parts 2 indicated diagrammatically in FIG. 2, their weight being indicated diagrammatically by an arrow 82, does not act in the conveying direction, that is to say, vertically, on the conveyor belt 7. In this case, the weight 82 of the quantity 81 of individual parts 2 contained in the storage area 34 rests, on the side wall 77 opposite to the storage area 34, whereby the entrainment elements 8 entrain individual parts 2 or groups thereof to an extent corresponding to the number of entrainment elements 8 or height of the cross-pieces forming the entrainment elements 8.

Since the quantity of parts 2 slips from the storage area 34, mainly vertically with respect to the direction of the side wall 77, through the feed device 11, the residual quantities of the individual parts 2 remaining in the region of the end wall 78 of the receiving chute 10 are moved in the direction of the entrainment elements 8 of the conveyor belt 7. It is thereby ensured that efficient follow-up of individual parts 2 from the storage area 34 is also achieved in the case of a direction which is vertical with respect to the direction of movement of the individual parts 2 out of the storage area 34. Also, the force needed to release the individual parts 2 or groups thereof from the quantity 81 of separated parts is reduced and stressing of the individual parts 2 is also reduced because the drive motor 9 for the conveyor belt 7 needs less power.

As best seen in FIG. 3, the frame 3 may be of approximately C-shaped cross-section extending vertically with respect to the working surface 5, the conveying device 6 being arranged on the base of the C facing away from the inwardly bent shanks thereof, the linear conveying device 13 being arranged between the base and said shanks.

Inwardly bent uprights 83 of said shanks may support a guide device 84 and counter-weights 85 for a vertically-adjustable protective cover 86, which acts as a guard for the linear conveying device 13.

The cover 86 may be associated with protective switches, for automatically causing the drive motors and drives, in particular the drives 18, to be stopped.

Figure 6:
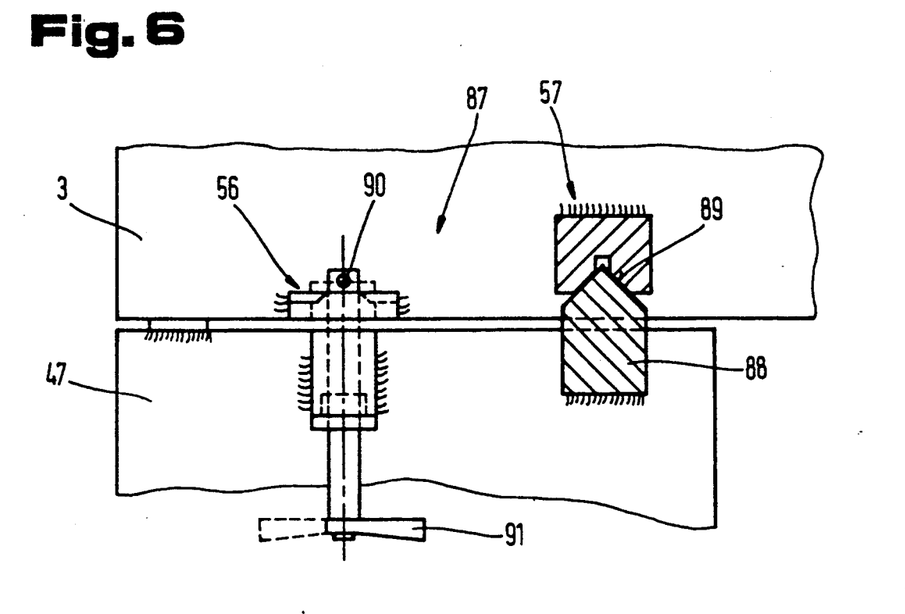
FIG. 6 is a simplified fragmentary plan view, shown partly in section, of a docking device for connecting said apparatus to a changeover container.
Figure 7:
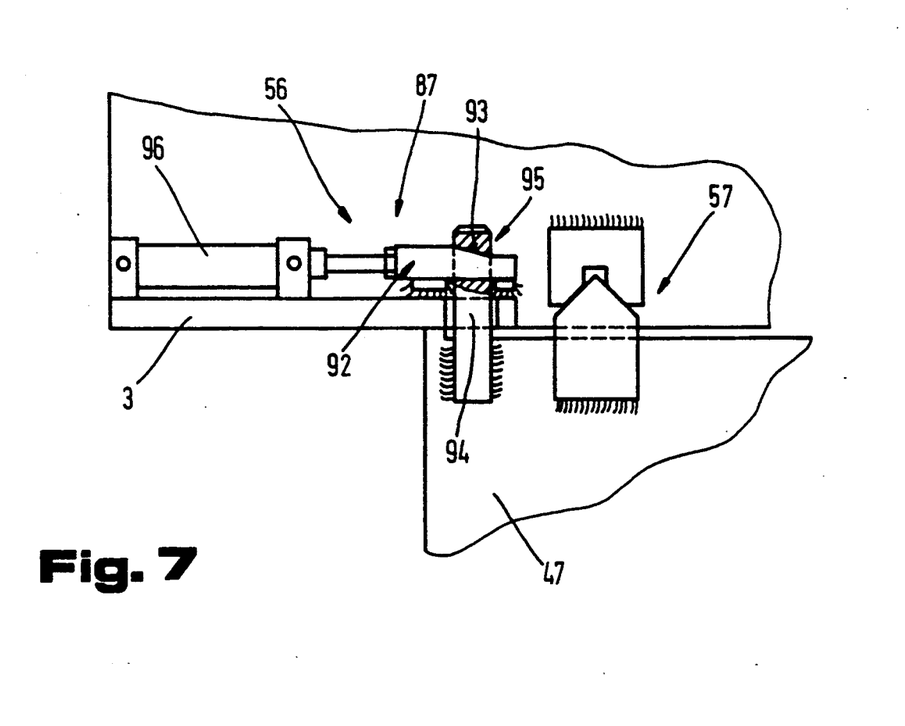
FIG. 7 is a diagrammatic fragmentary plan view, shown partly in section of a variant of said docking device.

FIG. 6 shows a docking device 87 comprising a coupling piece in the form of a centering pin 88, for introduction into a tapered, centering and holding fixture 89 in the form of a further coupling piece, providing the centering piece 57. The locking device 56 comprises a coupling piece in the form of a tightening bolt 90, connected to a swivel axis and having a hand lever 91, movable from a docking first position (shown in full lines), in engagement with the bolt 90 with tapered tightening faces arranged on the machine frame 3, tightening the frame 3 against the undercarriage 47; into an uncoupling second position indicated in broken lines. Instead of the hand lever 91, a piston-and-cylinder arrangement or indeed any other suitable adjustment drive may be provided for actuating bolt 90. As shown in FIG. 7, the docking device 87 comprises a centering device 57 as in FIG. 6. The locking device 56, however, comprises a coupling piece in the form of a chucking wedge 92 cooperating with a coupling piece projecting through a guide opening 93 in the direction of the frame 3 connected to the undercarriage 47 and being in the form of a tightening trunnion 94. The trunnion 94 is provided with an opening 95, extending therethrough radially, for the chucking wedge 92, which after the penetration of the tightening trunnion 94 into the guide opening 93, is pressed by means of an adjusting drive 96 into the receiving opening 95. By virtue of the chucking wedge 92, which widens in a tapered manner in said direction of movement, the undercarriage 47 is brought into a desired play-free position with respect to the machine frame 3.

Figure 8:
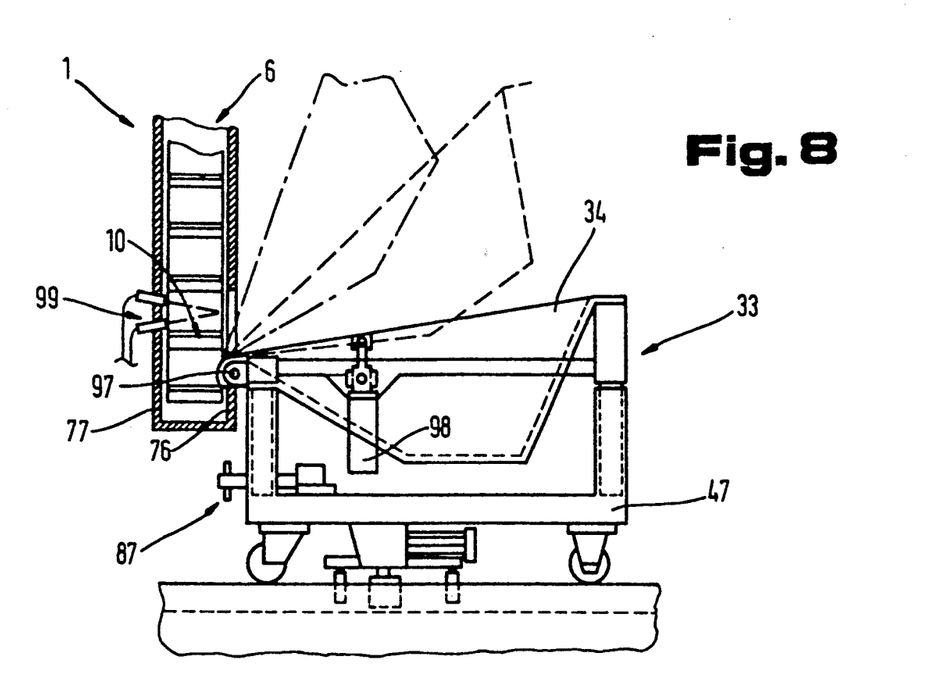
FIG. 8 is a diagrammatic side view, shown partly in section, of a variant of said changeover container arranged on travelling gear.

FIG. 8 shows a changeover container 33 in relation to the conveying device 6 of the apparatus 1. As shown, the storage area 34 is mounted for tilting about a swivel axis 97 running parallel to the side wall 76. A desired amount of the disordered quantity of individual parts 2 in the storage area 34 can thereby be fed to the receiving chute 10. In order to avoid overfilling the chute 10 with individual parts 2, there may be provided proximate to the side wall 77 a monitoring device 99 comprising, for example light emitting diodes and light receivers. When the light beams (indicated by broken lines) emitted by said diodes, are interrupted, the device 99 causes the storage area 34 to be tilted back and when the supply of individual parts 2 in the receiving chute 10 falls below a given level determined by the device 99, the device 99 initiates a further supply of the individual parts 2.

Figure 9:
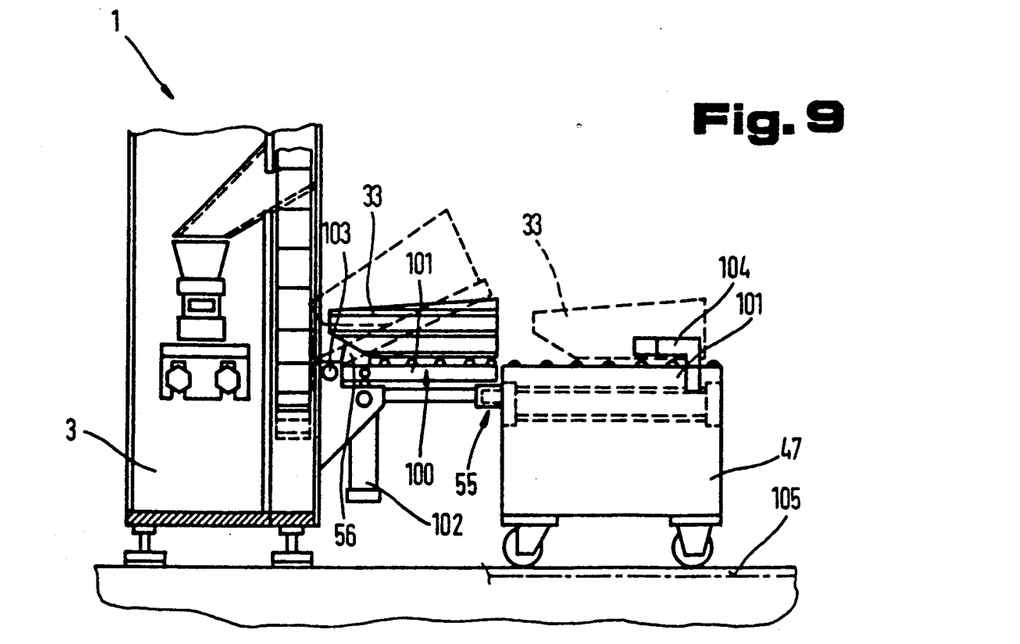
FIG. 9 is a simplified diagrammatic side view of an arrangement of changeover containers for changing over on a machine table by means of travelling gear.

As shown in FIG. 9, the changeover container 33 is arranged so as to be movable, for example, on a conveyor track 100 which may be a driven roller track. A part 101 of the track 100 is selectively pivotal by means of a swivel drive 102, about an axis 103 mounted on the frame 3, from the position shown in full lines into that shown in broken lines, to control the quantity of individual parts 2 fed to the receiving chute 10.

The transport of the changeover containers 33 from a central store to the individual apparatus 1 can be effected by means of undercarriage 47, on which may be provided driven conveyor track parts 101. For holding and positioning the changeover containers 33, holding devices 104 are provided proximate to the parts 101. For the positioning of the undercarriage 47 in order to transfer the changeover containers 33 from the conveyor track parts 101 on the undercarriage 47 to the conveyor track parts 101 attached to the frame 3, there is provided a docking device 55 for example as described above. Any other suitable docking device may however, be used for aligning the conveyor track parts 101 with each other and also for fixing the changeover container 33 to the conveyor track part 101 nearest to the conveying device. In the present example, the undercarriage 47 may also be a self-propelled, remote-controlled supply vehicle, controlled or guided by means of armatures 105 (indicated diagrammatically by broken lines) set in the base.

Figure 10:
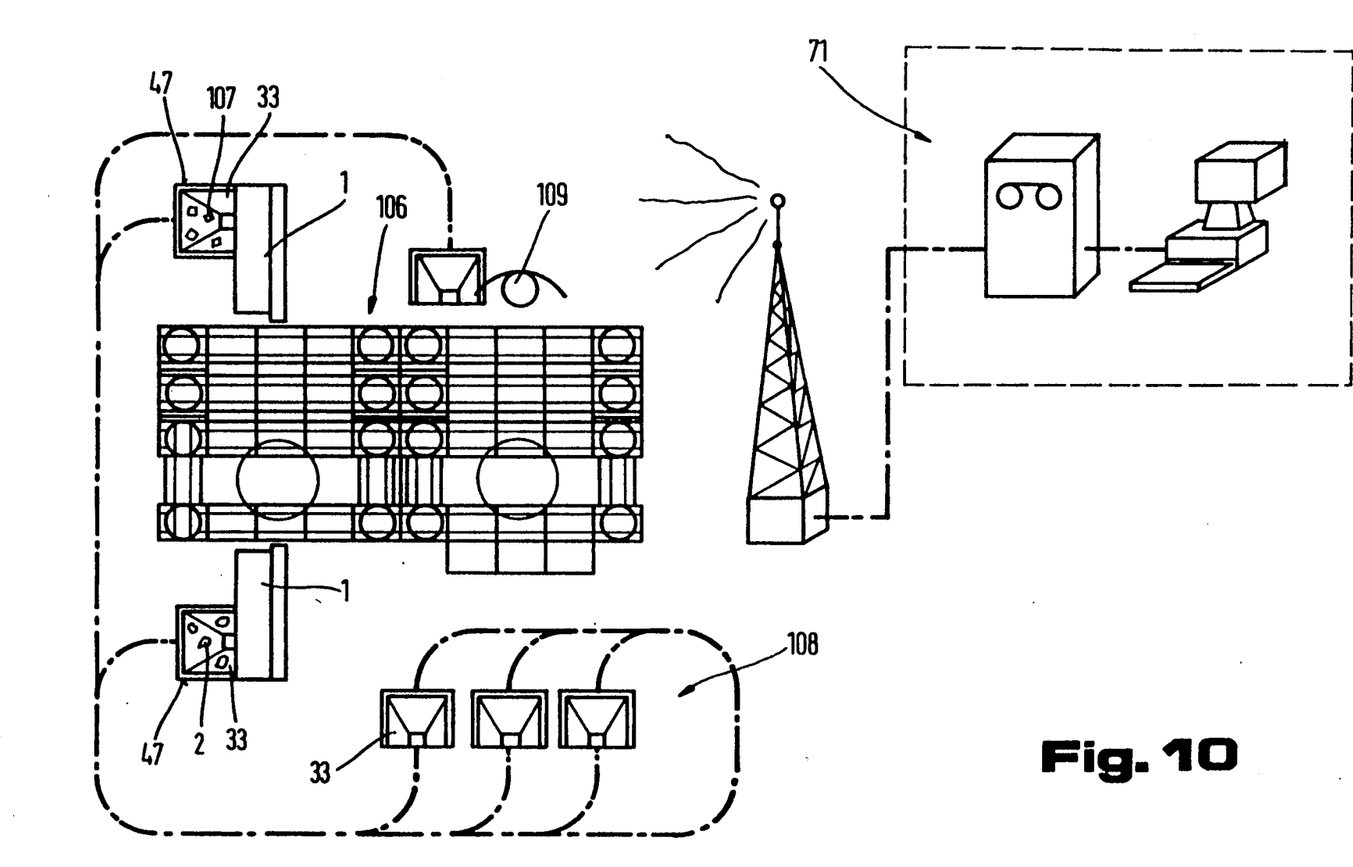
FIG. 10 is a schematic view of a semiautomatic or fully automatic installation comprising aligning and/or sorting apparatus associated with changeover containers which are movable independently of each other by travelling gear means.

FIG. 10 shows an installation for the supply of a fully automatic assembly station 106 with individual parts 2, and 107 of the same, or of different, type by means of changeover containers 33. The changeover containers 33 are charged, for example in a garage area 108 with different individual parts 2, and 107, depending upon the type of individual parts in the assembly station 106. The containers 33 are brought into the region of individual apparatus 1 for the fully automatic supply, orientation, and if applicable sorting, of the individual parts 2 and 107. Thus, the changeover containers 33 may also serve for supplying to an operator 109 separate individual parts 2 and 107 to be mounted by the operator 109 on workpiece carriers, in sufficient quantity and of the kind needed.

The overall supply of parts 2 and 107 to the assembly station 106 may be controlled from the control centre 71, for example, by the use of wireless remote-controllable undercarriage 47 or self-driving conveying vehicles, for depositing the changeover containers 33 in the garage area 108, or waiting for the next charge w.th& the changeover containers on the vehicles. Even with the use of fully automatic or semi-automatic assembly stations 106 for the production of small numbers of components, these can be economically supplied in the numbers needed, and being of the type or types needed, to operators 109 or to the individual apparatus 1 for separating or feeding individual parts.

In assembly stations for the production of components in very large numbers, or in so-called "ghost shifts", the supply of parts can be effected fully automatically. For the transport of the changeover containers any suitable self-driving vehicles or overhead conveyors or the like may be used with changeover containers or palettes of any desired construction.

What is claimed is:

1. An apparatus for arranging individual parts, which comprises
   (a) a machine frame;
   (b) a conveying device for the individual parts, the conveying device being mounted on the machine frame and comprising
      (1) a chute having a pivotal bottom, a front wall and a rear wall, and
      (2) a conveyor extending in a plane, the front wall extending parallel to the conveyor plane;
   (c) a storage container defining a storage area for a randomly arranged quantity of said individual parts;
   (d) a docking device for exchangeably connecting the storage container to the front wall, the storage container having an outlet for supplying the individual parts to the pivotal conveyor chute bottom and the conveyor conveying the individual parts supplied thereto; and
   (e) a linear sorting conveyor arranged adjacent the rear wall for receiving the conveyed individual parts and for orienting the individual parts.

2. The apparatus of claim 1, wherein the front wall comprises an adjustable wall part for closing an inelt of the chute, the front wall having an upper edge spaced a preselectable distance above an outlet edge of the storage area.

3. The apparatus of claim 2, wherein an outlet plate having said outlet edge defines a bottom of the storage area, the outlet plate extending obliquely with respect to the conveyor plane and inclined in a direction thereof.

4. The apparatus of claim 1, further comprising an undercarriage whereon the storage container is mounted for movement towards and away from the front chute wall.

5. The apparatus of claim 4, further comprising an adjusting device for adjusting the position of the storage container on the undercarriage with respect to the conveyor.

6. The apparatus of claim 5, wherein the storage container is pivotally mounted on the undercarriage for pivoting about a horizontal axis.

7. The apparatus of claim 4, wherein the docking device is mounted on the undercarriage and comprises means for locking the storage container to the machine frame and for centering the storage container with respect to the conveyor.

8. The apparatus of claim 4, comprising a plurality of said exchangeable storage containers, a control center for controlling movement of the undercarriage whereon the containers are mounted.

9. The apparatus of claim 8, further cmoprising a wireless transmitter-receiver device at the control center.

10. The apparatus of claim 8, further comprising guide rail means for the undercarriages.

11. The apparatus of claim 10, wherein the guide rail means comprises a guide rail section adjacent the front chute wall, the guide rail section being pivotal about a horizontal axis relative to the conveyor.

12. The apparatus of claim 1, further comprising an adjustable closure for closing the outlet of the storage area.

* * * * *

UNITED STATES PATENT AND TRADEMARK OFFICE
CERTIFICATE OF CORRECTION

PATENT NO. : 5,143,506
DATED : September 1, 1992
INVENTOR(S) : Walter Sticht

It is certified that error appears in the above-identified patent and that said Letters Patent is hereby corrected as shown below:

Title page, item [22] Filed: delete "July 21, 1990" and substitute therefor --September 21, 1990--.

Signed and Sealed this

Fifth Day of October, 1993

Attest:

BRUCE LEHMAN

Attesting Officer

Commissioner of Patents and Trademarks